(12) United States Patent
Fasig et al.

(10) Patent No.: US 7,478,001 B2
(45) Date of Patent: Jan. 13, 2009

(54) SYSTEMS AND METHODS FOR TEMPERATURE-COMPENSATED MEASURING OF A LOAD

(75) Inventors: Harold Fasig, Eugene, OR (US); Bernard L. Koenigsberg, Eugene, OR (US)

(73) Assignee: Hi-Tech Transport Electronics, Inc., Eugene, OR (US)

( * ) Notice: Subject to any disclaimer, the term of this patent is extended or adjusted under 35 U.S.C. 154(b) by 0 days.

(21) Appl. No.: 11/737,629

(22) Filed: Apr. 19, 2007

(65) Prior Publication Data

US 2008/0262774 A1    Oct. 23, 2008

(51) Int. Cl.
*G01G 23/01* (2006.01)

(52) U.S. Cl. .................. 702/101; 73/1.13; 177/136

(58) Field of Classification Search .................. 73/1.13, 73/1.15; 177/50, 211, 136, 137; 702/101–102, 702/173–174
See application file for complete search history.

(56) References Cited

U.S. PATENT DOCUMENTS

| 4,804,052 A | * | 2/1989 | Griffen ................. 177/25.14 |
| 6,668,212 B2 | * | 12/2003 | Colangelo et al. ........... 700/275 |
| 7,009,118 B2 | * | 3/2006 | Pottebaum et al. .......... 177/136 |

* cited by examiner

*Primary Examiner*—Randy W Gibson
(74) *Attorney, Agent, or Firm*—Klarquist Sparkman, LLP

(57) ABSTRACT

A method for temperature-compensated weight measurement includes receiving a first output signal from a load sensor device coupled to a structural member, receiving a second output signal from a temperature sensor device, and calculating a load weight value by using the first output signal and the second output signal, and applying a statistically-generated temperature compensation factor.

13 Claims, 3 Drawing Sheets

SYSTEMS AND METHODS FOR TEMPERATURE-COMPENSATED MEASURING OF A LOAD

TECHNICAL FIELD

The disclosed technology relates to systems and methods for temperature-compensated measuring and monitoring of a load, such as a load on a truck.

BACKGROUND

Trucks and other heavy vehicles are equipped with a steer axle, which generally bears the load of the front portion of the vehicle. The load on the truck, insofar as it affects the load on the steer axle, can be measured with a parasitic sensor that mechanically mimics the miniscule motion of the steer axle under load, specifically, a slight bending or depression in the middle of the steer axle. Strain gauges bonded to the sensor are read by a related electronics system. Such a device is described in U.S. Pat. No. 4,042,049 issued to Reichow et al. (hereafter referred to as the '049 patent).

A deflection transducer is often used in such a manner to obtain a fast and accurate "on-board" reading of vehicle load weight. An on-board weighing system permits convenient measurement of load and vehicle weight at any time without the necessity of using a conventional scale, such as at the time of initial loading, when part of the original load is removed from the vehicle, or when a partial new load is added. An on-board system prevents accidental overloads and the possible fines and other inconveniences associated therewith, while insuring that the vehicle is loaded substantially to its permitted capacity whenever possible.

However, conventional onboard weighing systems using deflection sensors, such as the system shown in the '049 patent, are typically subject to inaccurate or fluctuating weight readings due to changes in the sensor influenced by the ambient temperature adjacent to the sensor. Such temperature changes are usually not indicative of vehicle load, but they do have an effect on the sensor output.

More generally, parasitic weighing systems, including the system shown in the '049 patent, function by mimicking the deflection of the structural member to which they are attached through a calibrated linear function. That structural member has its own thermal coefficient of expansion, which has a further effect on the sensor output that is not indicative of the load on the structural member.

While a zero-offset temperature-compensating resistor is sometimes included in the strain gauge circuitry on a deflection sensor, its compensating effect is accurate only for a single load on the deflection sensor. Typically this is the no-load case, hence the term zero-offset. However, changing the load on the sensor will introduce inaccuracies in the temperature compensation and, for a zero-offset temperature-compensated deflection sensor, the greater the load means the greater the temperature-induced inaccuracy.

Likewise, those who are expert in the art of strain gauge sensors may, with considerable effort, be able to calibrate an individual sensor for the full span of weight and a partial range of temperature, with −10° C. to 40° C. being the strain gauge industry's standard. This requires testing each sensor over its temperature and weight range and physically installing or adjusting one or more discrete temperature-compensating resistors to account for the individual sensor's variability. However, the time and expertise required as well as the variability of the result make this impractical for general usage.

Whereas a sensor-processing microcomputer may sense its local ambient temperature and apply a blanket compensation appropriate to a distributed network of deflection sensors, such sensors are likely to be operating in different thermal environments. This difference in local sensor temperature can be the cause of inaccuracies, especially at temperature extremes.

Such a sensor-processing microcomputer could employ temperature sensors adjacent to each of the deflection sensors, but the additional wiring, programming considerations, and complexity of installing such a system would make this commercially prohibitive.

U.S. Pat. No. 4,543,837 to Stern et al. describes a load cell temperature-compensating system in which a mechanical fixed reference is used, but this method is cumbersome and does not make use of any statistical compensation. Some companies produce temperature-compensated on-board truck scales, but such scales rely on "load cell" type of sensors, and none of them are known to employ the more easily installed "deflection" type of sensors.

Thus, there exists a need for an economically-produced deflection sensor system capable of operating in on-board vehicle environments with compensation for a widely-changing thermal environment, assuring full possible design accuracy.

There also exists a need for a deflection sensor system capable of operating in on-board vehicle environments in which the compensation for the sensor's thermal coefficient is specifically optimized but not necessarily matched to the thermal coefficient of expansion of the structural member to which it is attached.

Additionally, there exists a need for a statistically-determined temperature-compensated load sensor system in which the characteristics of a class of load sensors can be averaged, with the results used within an electronic controller to produce an output signal that reflects substantially only the characteristics of the load, and is not responsive to variations in temperature.

Also, there exists a need for a sensor that can be matched to an underlying structural member in such a way as to compensate for dimensional changes in that structural member that are unrelated to weight, such as thermal expansion in one or more axes, or changes in the material hardness and other qualities at temperature extremes, so that the sensor is responsive only to variations in the weight bearing on the underlying structural member.

Additionally, there exists at the point of manufacture, a need for the ability to compensate for lot-to-lot variations in regards to the electronic qualities of a class of sensors' electronic components, such as gain and offset, to create greater uniformity of response from sensor to sensor.

SUMMARY

Embodiments of the disclosed technology relate to an improved vehicle suspension deflection sensor system, particularly for use with heavy vehicles such as trucks. Various embodiments of the disclosed technology relate to temperature-compensated deflection sensor systems that can result in improved methods of monitoring the weight on a vehicle's suspension and, thus, the weight of a load and/or the weight of the vehicle.

In some embodiments, a method for temperature-compensated weight measurement can include receiving an output signal from a load sensor device mounted on a structural member, receiving an output signal from a temperature sensor device, and calculating a load weight value by using both of the output signals and applying a statistically-generated compensation factor.

The act of calculating a load weight value can include determining multiple individual compensation factors wherein each individual compensation factor corresponds to an individual load sensor device, and averaging the compensation factors determined.

Alternatively, the act of calculating a load weight value can include determining multiple individual compensation factors pertaining to a single load sensor device, and averaging the individual compensation factors determined.

In some embodiments, in response to a detected change in either or both of the output signals from the load sensor and the temperature sensor, the load weight value can be re-calculated by using the output signals from the load sensor and the temperature sensor and applying the statistically-generated compensation factor.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

Figure 1:
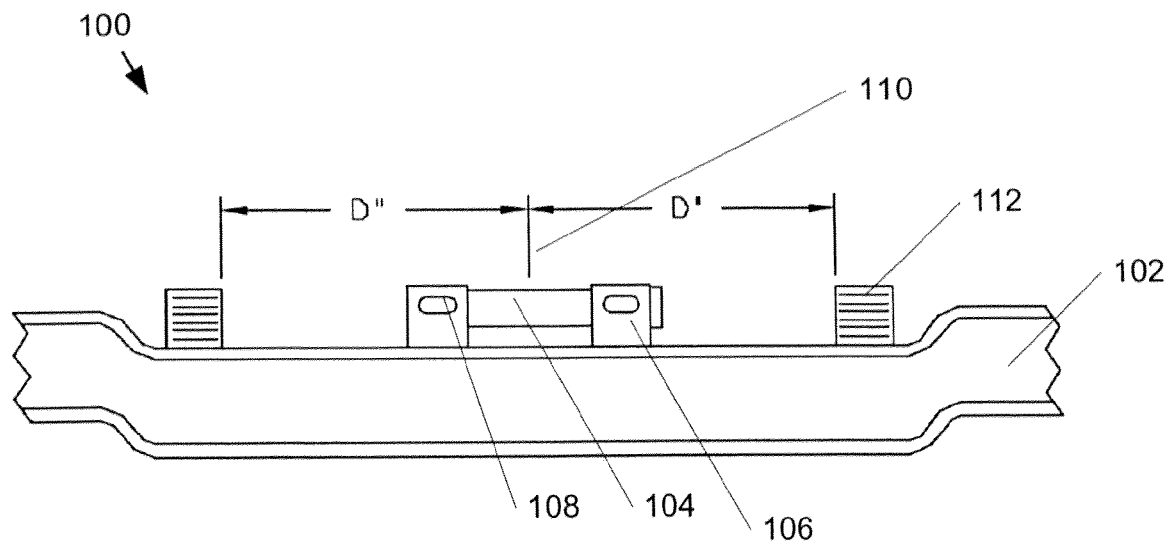
FIG. 1 is a block diagram illustrating an exemplary embodiment of a temperature-compensated deflection sensor system such as can be mounted on a portion of a truck steer axle.

Various embodiments of systems and methods for temperature-compensated measuring and monitoring of a load, such as a load on a truck, are described below with reference to the accompanying drawings.

In one embodiment, a bridge strain gauge deflection sensor system is used in measuring truck axle and load member deflections due to the weight applied to the truck. This deflection sensor system overcomes the problems associated with the conventional deflection sensors described above by monitoring the ambient temperature around the sensor and accounting for thermal effects in producing its output, for example. Thus, this improved deflection sensor system is able to accurately detect the tensile and compression deflection, thereby providing the desired accurate indication of vehicle load.

In some embodiments, a deflection sensor system comprises a programmable controller that can amplify and process a strain gauge signal stimulus to provide a digitally calibrated, analog output signal for zero, span, zero drift, span drift, and sensor linearization errors with the application of stress and/or load changes to the truck.

The programmable controller, associated memory, and analog circuitry electronics can be packaged on a small printed circuit board that can be mounted in close proximity to the strain gauge (e.g., within 2 inches of the strain gauge), thereby resulting in the reduction or complete elimination of spurious noise errors. Another advantage of such embodiments is that the lookup table (e.g., a table for storing the parameters) can be located locally by virtue of an adjacent integrated circuit on the same circuit board, which can make the entire sensor assembly more adjustable and significantly easier to install.

The deflection sensor system can include a strain gauge and control electronics that together can provide an output signal appropriate for the specific load. The deflection sensor system can operate over various temperature ranges (e.g., from −40° C. to +85° C.). The deflection sensor system can also operate over various load ranges (e.g., from no-load to full-load).

In some embodiments, the control electronics can be implemented using a Texas Instruments PGA309 Voltage Output Programmable Sensor Conditioner with associated Microchip 24LC16B serial EEPROM external memory for the storage of operating variables as described below. The controller integrated circuit can connect directly to a bridge strain gauge mounted, for example, on a flexible steel blank. The steel blank can be attached to a truck axle in such a way as to measure the axle flexure under a load. The control electronics can provide an excitation voltage to the bridge strain gauge and measure the bridge differential output to produce a voltage output signal as the steel blank flexes. The control electronics can also have a built-in temperature sensor. The voltage output signal can be further processed by a microcomputer mounted inside the truck driver's cab, for example, to indicate how much the truck weighs. The microcomputer can provide electrical power to the deflection sensor's control electronics.

In some embodiments, the controller can be designed to allow operation of a sensor in either "explicit" or "approximate" mode. Both modes can be enabled, for example, through the use of operating variables stored in local memory, which the controller can use to vary or adjust internal gain and control values. These operating variables can change depending upon various load and temperature conditions as sensed by the controller, and can map to different gain and feedback values to compensate for errors in the bridge strain gauge and associated electronic circuitry.

In some embodiments, "explicit" mode can allow a user to select a specific variable set that can mate the controller to each individual bridge strain gauge. This mode can provide extremely accurate operation of the sensor subsystem over the entire load operating range and/or temperature operating range, for example. Deflection sensors operating in this mode can have error rates less than ±0.5% of the load operating range, also described as less than ±0.5% of full scale.

In some embodiments, "explicit" mode can involve the use of software tools to enter sensor parameters and other variable parameter information associated with the controller circuitry such as gain, offset, and control values, for example, into a software spreadsheet calculator that can compute controller final output constraints. This operation can tune the controller gain and control variables via a three stage successive approximation process. Gain and control variables used by the controller can be tuned by subjecting the sensor and associated electronics to three different loads at three different temperatures across the operating range of the sensor, for example. Load, temperature, and output readings can be taken and entered into the software spreadsheet during each step of the process. The software spreadsheet can use derived values to calculate the gain and control variables that can ultimately be used by the controller in a final variable set to be loaded into the controller memory. The controller can then use the final variable set with the subject sensor, for example, over its entire operating range of load and/or temperature. This exemplary process can be repeated for each sensor to be used. In other embodiments, the complexity of this controller-tuning process can be significantly reduced through the use of an "approximate" mode, as described below.

In some embodiments, "approximate" mode can allow a user to select a general variable set derived using a statistical sampling scheme. For example, "approximate" mode can use a number of sample sensors to produce an average variable set that can be used to program subsequent sensors. While "explicit" mode generally results in very accurate individual sensors, "approximate" mode can allow the programming of an entire lot of sensors using the same variable set. Deflection sensors operating in this mode can have error rates less than ±2% of the load operating range, also described as less than ±2% of full scale.

In some embodiments, "approximate" mode can use the same successive approximation scheme as described above with respect to "explicit" mode embodiments to determine the final variable set for a statistical sample set of sensors selected randomly from the entire sensor lot. Specifically, controller output readings for temperature and output voltage at each of three temperature and load points can be averaged over the sample lot. The average value for each variable can then be entered into the software spreadsheet to produce a final average program variable set. This final variable set can then be used to program each subsequent sensor from the entire sensor lot.

Whereas the "explicit" mode program development sequence is usually repeated for each and every sensor to be programmed in some embodiments, the "approximate" mode program in other embodiments can be derived statistically from a sample lot of sensors that can be further used to program all subsequent sensors from the entire lot with a common program. While the same iterative process can be used to develop the program variables for each sensor in the statistical sample lot, further individual sensor program development processes would typically not be required. The reduction of complexity of program development is generally proportional to the quantity of sensors subsequently programmed with the same "approximate" program and not subject to the entire program development process.

In some embodiments, the control electronics can be supplied with a fixed execution procedure that can read variables from a programmable external memory. The controller can use these variables with the input from the strain gauge and a temperature sensor to calculate an output, using a set of mathematical functions implemented by a fixed execution procedure, for example. The calculation's result can provide the proper sensor output response through the use of approximating second order polynomials for each of three variables that determine sensor accuracy. The three variable relationships that can be used by these polynomials are span vs. temperature (e.g., the magnitude of the output voltage gain compensation for temperature effects on the sensor element with respect to a steady input), zero offset vs. temperature, and output signal vs. sensor input.

In some embodiments, the resulting output follows the function $$K(p,T)=k_0+k_1T+k_2T^2+(k_3p+k_4p^2)\times(1+k_5T+k_6T^2)$$

where:

K is the control electronics' output function in volts per volt of excitation;

p is the sensor input voltage derived from the strain gauge under applied load and a fixed excitation voltage V;

T is the temperature in degrees Celsius;

$k_0$, $k_1$ and $k_2$ are offset polynomial coefficients representing initial, first and second order drift;

$k_3$ and $k_4$ are input variable sensitivity and non-linearity; and $k_5$ and $k_6$ are span first and second order temperature drift.

Examples of representative k coefficients can appear as follows:

$k_0$=0.00606

$k_1$=−0.0000001338

$k_2$=0.000000002974

$k_3$=−0.00001689

$k_4$=0.000000001153

$k_5$=0.0003305, and $k_6$=0.00000004255.

In some embodiments, the preceding equation can define three degrees of freedom: (1) offset versus temperature, (2) span vs. temperature, and (3) sensor sensitivity vs. applied load. Each degree of freedom can be described by a quadratic equation that the controller can continually process as a portion of its fixed execution procedure, in order to produce a compensated output signal according to the derived variables stored in external memory, for example.

In some embodiments, a deflection sensor system can be assembled such that an underlying structural member has a different thermal coefficient of expansion, or changes in the material hardness and other qualities at temperature extremes. In such embodiments, the factors of the polynomial function can be determined by subjecting the assembly comprising the deflection sensor and the structural member to a combination of various weights and/or temperatures.

In some embodiments, a sensor system with statistically-generated temperature compensation can have the offset or bias of the amplified output modified at the point of manufacture, to compensate for lot-to-lot output variations in the electronics components, thereby creating greater uniformity of response from sensor to sensor.

FIG. 1 illustrates an exemplary embodiment of a temperature-compensated deflection sensor system 100 mounted on a portion of the steer axle 102 of a truck. In the example, a deflection sensor 104 is mounted to a steer axle 102 by means of a pair of brackets 106. The deflection sensor 104 is held to the brackets 106 by way of a pair of fasteners 108. The deflection sensor 104 is centered on the centerline 110 of the steer axle 102, as measured equidistantly from the vehicle springs 112.

Figure 2:
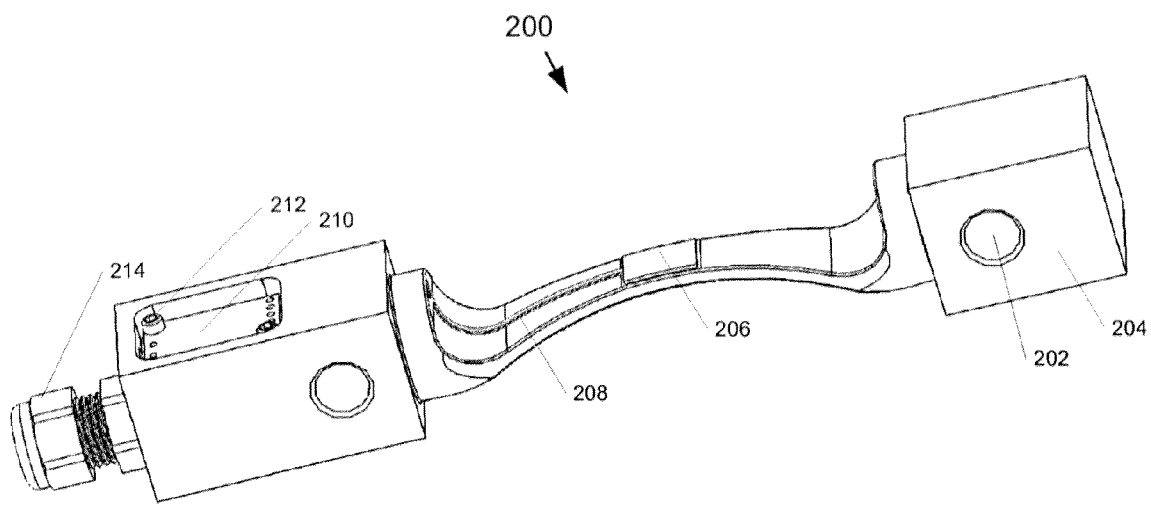
FIG. 2 is an isometric view of an exemplary embodiment of a temperature-compensated deflection sensor system, such as the temperature-compensated deflection sensor system of FIG. 1.

FIG. 2 provides a closer view of a deflection sensor system, such as the deflection sensor system 100 of FIG. 1, by showing an isometric view of a temperature-compensated deflection sensor system 200, which is attached to brackets (e.g., the pair of brackets 106 of FIG. 1) by fasteners (e.g., the fasteners 108 of FIG. 1) through holes 202 at each of the sensor system's ends 204. While the illustrated embodiment shows round holes, one of skill in the art will appreciate that each hole may be one of a various number of shapes, such as a square.

In the example, a strain gauge 206 is adhered to the central portion of the sensor bridge, and wires 208 provide an interface between the strain gauge 206 and a temperature-compensating controller 210, which is held in place by fasteners

212. Wiring provides a connection between the sensor and the outside world through a strain relief 214.

Figure 3:
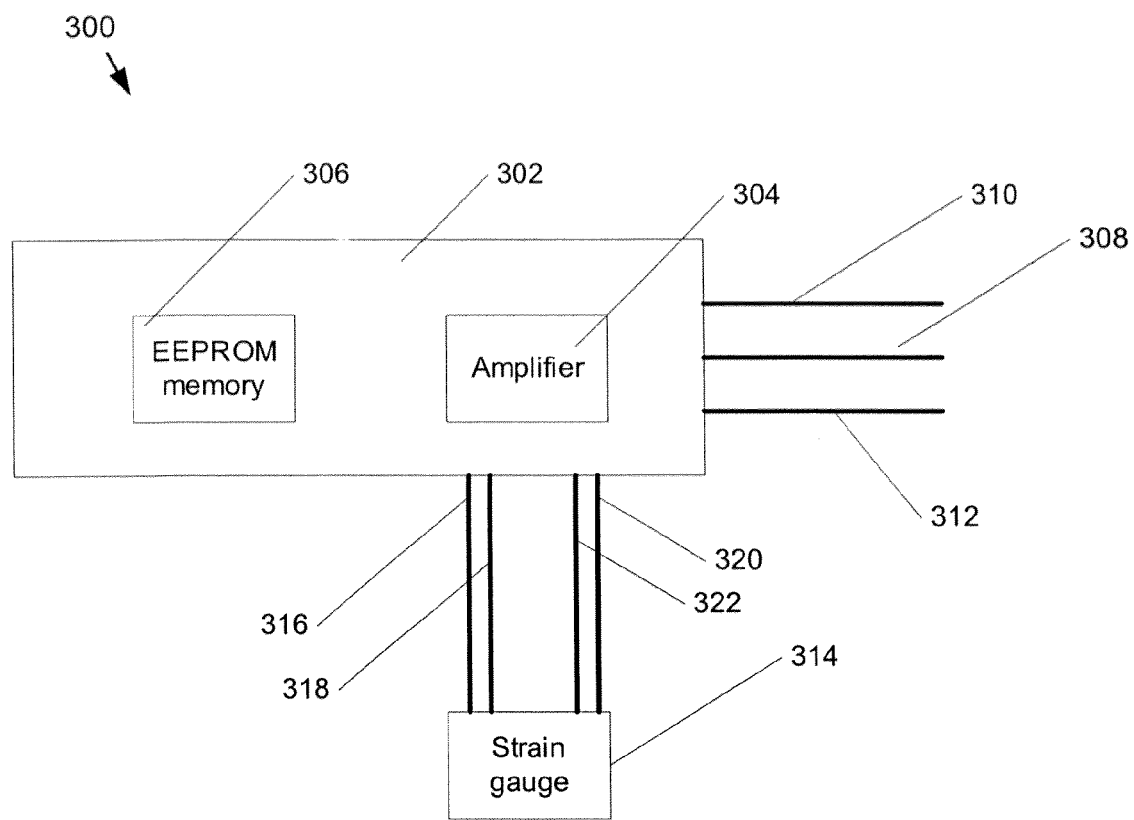
FIG. 3 is a block diagram illustrating an exemplary embodiment of a temperature-compensated deflection sensor system's electronics controller circuit.

FIG. 3 shows a block diagram of an exemplary embodiment of a temperature-compensating deflection sensor system's electronics controller circuitry 300. A circuit board 302 has two major components: an amplifier 304 (e.g., a PGA309 amplifier) for exciting a strain gauge 314 and processing its output, and EEPROM memory 306 for storing temperature compensation and signal gain factors, for example. The circuit board 302 receives 5Vdc power via a wire 308 with ground return via 310, and it outputs the amplified strain gauge signal via a sensor wire 312. The amplifier 304 excites the strain gauge 314 via an excitation voltage wire 316 with ground return via 318, and receives the strain gauge's + and − signals via 320 and 322, respectively.

Having described and illustrated the principles of our invention with reference to illustrated embodiments, it will be recognized that the described embodiments are illustrative only and should not be taken as limiting the scope of our invention. For example, elements of the illustrated embodiments shown in software may be implemented in hardware and vice versa. Also, while several of the embodiments have been described in a heavy vehicle (e.g., truck) environment, the disclosed technology could be applied in other vehicle environments (e.g., boats) as well as various other environments other than vehicle environments, such as in conjunction with bridges or railroads (e.g., rail assemblies).

In view of the many possible embodiments to which the principles of our invention may be applied, we claim as our invention all such embodiments as may come within the scope and spirit of the following claims and equivalents thereto.

We claim:

1. A method of temperature-compensated weight measurement, comprising:
   computing the statistically-generated temperature compensation factor, wherein the computing comprises:
      determining at least two pluralities of individual temperature compensation factors wherein each of the pluralities of individual temperature compensation factors corresponds to one of a plurality of individual load sensor devices; and
      averaging the at least two pluralities of individual temperature compensation factors determined;
   receiving a first output signal from a load sensor device coupled to a load-bearing member;
   receiving a second output signal from a temperature sensor device; and
   calculating a load weight value by using the first output signal and the second output signal and applying a statistically-generated temperature compensation factor, wherein the temperature compensation factor is derived from temperature compensation factors of a statistical sampling of a sensor lot comprising the load sensor device.

2. The method of claim 1, wherein the load sensor device comprises a strain gauge.

3. A method of temperature-compensated weight measurement, comprising:
   computing the statistically-generated temperature compensation factor, wherein the computing comprises:
      determining a plurality of individual temperature compensation factors corresponding to the load sensor device; and
      averaging the plurality of individual temperature compensation factors determined;
   receiving a first output signal from a load sensor device coupled to a load-bearing member;
   receiving a second output signal from a temperature sensor device; and
   calculating a load weight value by using the first output signal and the second output signal and applying a statistically-generated temperature compensation factor, wherein the temperature compensation factor is derived from temperature compensation factors of a statistical sampling of a sensor lot comprising the load sensor device.

4. The method of claim 1, further comprising, in response to a detected change in the first output signal, re-calculating the load weight value by using the first output signal and the second output signal and applying the statistically-generated temperature compensation factor.

5. The method of claim 1, further comprising, in response to a detected change in the second output signal, re-calculating the load weight value by using the first output signal and the second output signal and applying the statistically-generated temperature compensation factor.

6. A method of temperature-compensated weight measurement, comprising:
   receiving a first output signal from a load sensor device coupled to a load-bearing member;
   receiving a second output signal from a temperature sensor device; and
   calculating a load weight value by using the first output signal and the second output signal and applying a statistically-generated temperature compensation factor, wherein the temperature compensation factor is derived from temperature compensation factors of a statistical sampling of a sensor lot comprising the load sensor device, and wherein the calculating comprises using the function $K(p,T)=k_0+k_1T+k_2T^2+(k_3p+k_4p^2)\times(1+k_5T+k_6T^2)$, wherein p is the first output signal from the load sensor device, wherein T is the second output signal from the temperature sensor device, wherein $k_0$, $k_1$ and $k_2$ are offset polynomial coefficients representing initial, first and second order drift, wherein $k_3$ and $k_4$ are input variable sensitivity and non-linearity, and wherein $k_5$ and $k_6$ are span first and second order temperature drift.

7. A method of compensating for temperature variations in a load sensor assembly, comprising:
   determining a plurality of temperature compensation values for a load sensor of the load sensor assembly compensating for temperature variations in the load sensor assembly by applying the temperature compensation values according to the function $K(p,T)=k_0+k_1T+k_2T^2=(k_3p+k_4p^2)\times(1+k_5T+k_6T^2)$, wherein p is a load signal sensed by the load sensor device, wherein T is temperature signal, wherein $k_0$, $k_1$ and $k_2$ are offset polynomial coefficients representing initial, first and second order drift, wherein $k_3$ and $k_4$ are input variable sensitivity and non-linearity, and wherein $k_5$ and $k_6$ are span first and second order temperature drift.

8. The method of claim 3, wherein the load sensor device comprises a strain gauge.

9. The method of claim 3, further comprising, in response to a detected change in the first output signal, re-calculating the load weight value by using the first output signal and the second output signal and applying the statistically-generated temperature compensation factor.

10. The method of claim 3, further comprising, in response to a detected change in the second output signal, re-calculating the load weight value by using the first output signal and the second output signal and applying the statistically-generated temperature compensation factor.

11. The method of claim 6, wherein the load sensor device comprises a strain gauge.

12. The method of claim 6, further comprising, in response to a detected change in the first output signal, re-calculating the load weight value by using the first output signal and the second output signal and applying the statistically-generated temperature compensation factor.

13. The method of claim 6, further comprising, in response to a detected change in the second output signal, re-calculating the load weight value by using the first output signal and the second output signal and applying the statistically-generated temperature compensation factor.

* * * * *

UNITED STATES PATENT AND TRADEMARK OFFICE
CERTIFICATE OF CORRECTION

PATENT NO. : 7,478,001 B2
APPLICATION NO. : 11/737629
DATED : January 13, 2009
INVENTOR(S) : Fasig et al.

It is certified that error appears in the above-identified patent and that said Letters Patent is hereby corrected as shown below:

In the Claims:

Column 8, line 49, "function $K(p,T) = k_0 + k_1T + k_2T^2 = (k_3p+k_4p^2)\times(1+k_5T+k_6T^2)$" should be -- function $K(p,T) = k_0 + k_1T + k_2T^2 +(k_3p+k_4p^2)\times(1+k_5T+k_6T^2)$ --

Signed and Sealed this
Eighteenth Day of January, 2011

David J. Kappos
*Director of the United States Patent and Trademark Office*